(12) United States Patent
Accapadi et al.

(10) Patent No.: US 7,496,595 B2
(45) Date of Patent: *Feb. 24, 2009

(54) METHODOLOGY FOR DIRECTORY CATEGORIZATION FOR CATEGORIZED FILES

(75) Inventors: Jos Manuel Accapadi, Austin, TX (US); Umesh G. Khatwani, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 231 days.

This patent is subject to a terminal disclaimer.

(21) Appl. No.: 11/424,668

(22) Filed: Jun. 16, 2006

(65) Prior Publication Data

US 2007/0294277 A1 Dec. 20, 2007

(51) Int. Cl.
*G06F 7/00* (2006.01)
*G06F 17/00* (2006.01)

(52) U.S. Cl. .................. 707/102; 707/101; 707/103 R; 707/103 X; 707/103 Z; 707/104.1

(58) Field of Classification Search ...................... 707/1, 707/2, 3, 104.1, 102; 382/181; 704/10; 715/700–866
See application file for complete search history.

(56) References Cited

U.S. PATENT DOCUMENTS

| | | | |
|---|---|---|---|
| 5,666,210 A | 9/1997 | Yanai et al. | |
| 6,088,696 A * | 7/2000 | Moon et al. | 707/10 |
| 6,466,238 B1 | 10/2002 | Berry et al. | |
| 6,496,206 B1 | 12/2002 | Mernyk et al. | |
| 6,501,491 B1 * | 12/2002 | Brown et al. | 715/853 |
| 6,820,094 B1 * | 11/2004 | Ferguson et al. | 707/200 |
| 6,820,111 B1 | 11/2004 | Rubin et al. | |
| 7,075,550 B2 * | 7/2006 | Bonadio | 345/589 |
| 7,162,466 B2 * | 1/2007 | Kaasten et al. | 707/1 |
| 7,331,020 B2 * | 2/2008 | Chang et al. | 715/843 |
| 2002/0075330 A1 | 6/2002 | Rosenzweig et al. | |
| 2004/0059742 A1 | 3/2004 | Altman | |
| 2004/0205625 A1 | 10/2004 | Banatwala et al. | |
| 2004/0268216 A1 | 12/2004 | Jacobs et al. | |
| 2005/0010871 A1 | 1/2005 | Ruthfield et al. | |
| 2005/0091184 A1 | 4/2005 | Seshadri et al. | |
| 2005/0192822 A1 | 9/2005 | Hartenstein et al. | |
| 2006/0015482 A1 | 1/2006 | Beyer et al. | |
| 2008/0021921 A1 * | 1/2008 | Horn | 707/102 |

* cited by examiner

*Primary Examiner*—Tony Mahmoudi
*Assistant Examiner*—Cecile Vo
(74) *Attorney, Agent, or Firm*—Duke W. Yee; Herman Rodriguez; Theodore D. Fay, III

(57) ABSTRACT

A computer implemented method, system, and computer usable program code are provided for categorizing directories using categorized objects. Responsive to receiving a plurality of objects, the plurality of objects are stored in a directory in a file system. One of a plurality of indicia is associated with each of the plurality of objects. The plurality of objects are displayed using the indicia as a marked objects and the directory is displayed using the indicia of an earliest stored marked object as a marked directory.

1 Claim, 9 Drawing Sheets

Directory 3

METHODOLOGY FOR DIRECTORY CATEGORIZATION FOR CATEGORIZED FILES

BACKGROUND OF THE INVENTION

1. Field of the Invention

The present application relates generally to directory categorization. More particularly, the present application relates to a computer implemented method, system, and computer usable program code for categorizing directories using categorized files.

2. Description of the Related Art

In computing, a file system is a method for storing and organizing computer files and the data the computer files contain to make it easy to find and access the computer files. File systems may use a storage device, such as a hard disk or CD-ROM, and involve maintaining the physical location of the files, or the file systems may be virtual and exist only as an access method for virtual data or for data over a network.

More formally, a file system is a set of abstract data types that are implemented for the storage, hierarchical organization, manipulation, navigation, access, and retrieval of data.

The most familiar file systems make use of an underlying data storage device that offers access to an array of fixed-size blocks, sometimes called sectors, generally 512 bytes each. The file system software is responsible for organizing these sectors into files and directories, and keeping track of which sectors belong to which file and which are not being used.

However, file systems may not make use of a storage device at all. A file system can be used to organize and represent access to any data, whether it be stored or dynamically generated.

Whether the file system has an underlying storage device or not, file systems typically have directories which associate file names with files, usually by connecting the file name to an index into a file allocation table of some sort, such as the File Allocation Table (FAT) in an Microsoft® Disk Operating System (MS-DOS) file system, or an inode in a Unix®-like file system. Directory structures may be flat, or allow hierarchies where directories may contain subdirectories. In some file systems, file names are structured, with special syntax for filename extensions and version numbers. In others, file names are simple strings, and per-file metadata is stored elsewhere.

While file systems provide an easier means to find and access the computer files, storing an unread or important file within the file system may cause finding the computer files at a later time more difficult. Thus, marking files and the directories where the files are stored will provide for easier retrieval of the files.

SUMMARY OF THE INVENTION

The different aspects of the illustrative embodiments provide a computer implemented method, system, and computer usable program code for categorizing directories using categorized objects. The illustrative embodiments store objects in a directory in a file system in response to receiving the objects. The illustrative embodiments associate one of a number of indicia with each of the objects. The illustrative embodiments display the plurality of objects using the indicia as marked objects and display the directory using the indicia of an earliest stored marked object as a marked directory.

BRIEF DESCRIPTION OF THE DRAWINGS

The novel features believed characteristic of the illustrative embodiments are set forth in the appended claims. The aspects of the illustrative embodiments, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
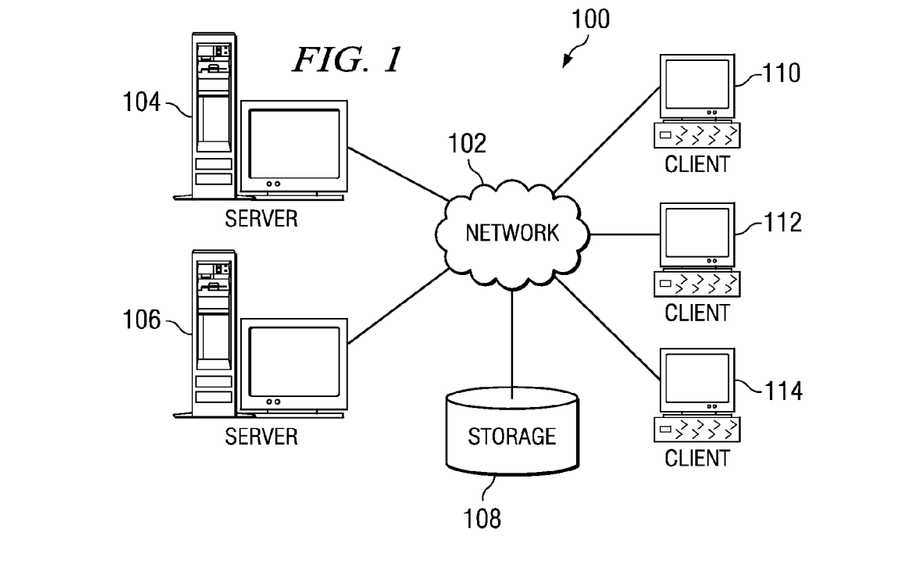
FIG. 1 depicts a pictorial representation of a network of data processing systems in which illustrative embodiments may be implemented.
Figure 2:
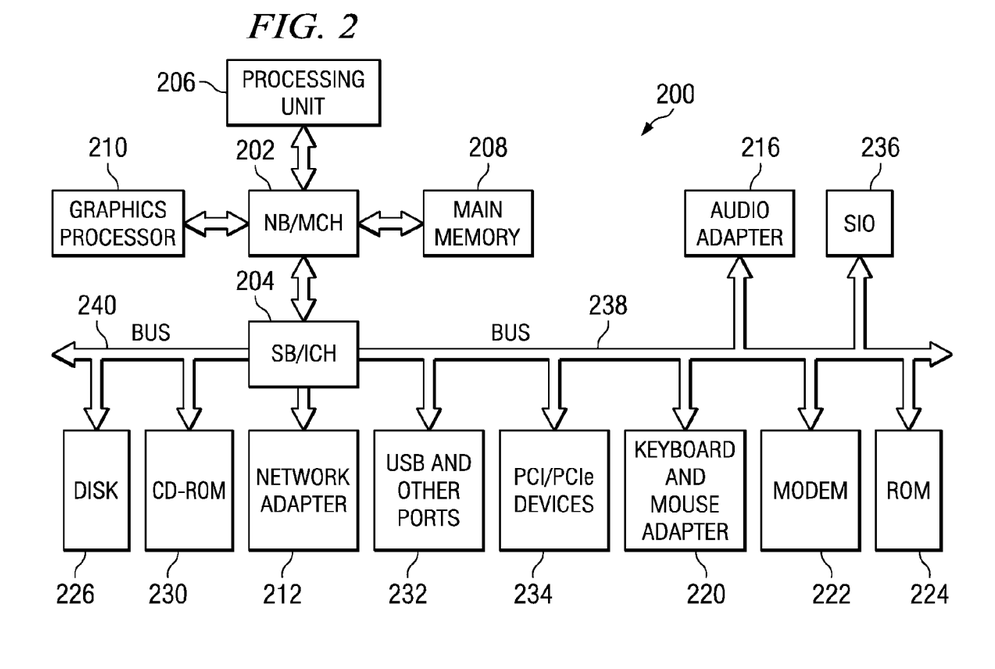
FIG. 2 depicts a block diagram of a data processing system in which illustrative embodiments may be implemented.

The illustrative embodiments provide for categorizing directories using categorized files. With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200 (Java and all Java-based trademarks are trademarks of Sun Microsystems, Inc. in the United States, other countries, or both).

Instructions for the operating system, the object-oriented programming system, and applications or programs are located on storage devices, such as hard disk drive 226, and may be loaded into main memory 208 for execution by processor 206. The processes of the illustrative embodiments may be performed by processor 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

When a user saves or detaches an unopened or important file to a directory, then the user may be given an option to identify the file as "urgent," "unread," "needs review," "come back to later," or some other type of identification. The identification of the file and the directories where the file is stored may be through the use of a color identification or indicator, based on choices selected at the time the identification is made or through a preset configuration. If the file is opened, the user may receive options to mark the file and directories. Once a user chooses an identifier, the files as well as the hierarchical directory structure would be identified up to the top level directory with the chosen identifier.

Figure 3:
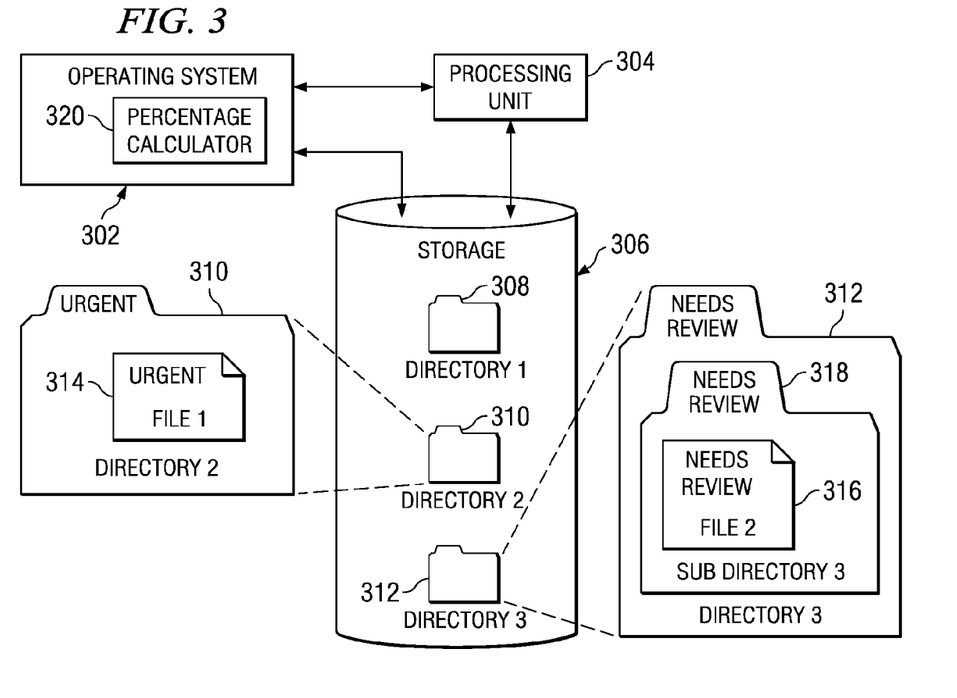
FIG. 3 depicts a functional block diagram of the components used to implement a file identification system in accordance with an illustrative embodiment.

FIG. 3 depicts a functional block diagram of the components used to implement a file identification system in accordance with an illustrative embodiment. Operating system 302 that runs on processing unit 304, such as processing unit 206 of FIG. 2, stores files on storage unit 306, such as storage unit 108 of FIG. 1 or hard disk drive 226 or CD-ROM drive 230 of FIG. 2. Storage unit 306 may be comprised of a hierarchical directory structure containing numerous directories such as directories 308, 310, and 312. While the illustrative embodiments uses the term files, a file may be any object that is stored in a file system, such as an email, a program, a text, or a picture. Directory 310 is shown to contain file 314. Directory 312 is shown to contain file 316 which is stored in subdirectory 318 within directory 312.

Operating system 302 may be modified in accordance with the described illustrative embodiments to identify a file that is stored on storage unit 306 with an indicia. The indicia may identify the file as "urgent," "unread," "needs review," "come back to later," or some other type of identification. Additionally, the directories where the file is stored may also take on the identification of the file in order to easily identify the directories where the identified file is stored.

As an example of this identification, file 314 has been identified by the user as an "urgent" file and is tagged with an "urgent" indicia. As shown, directory 310 where file 314 is stored is also tagged with an "urgent" indicia. As another example, file 316 has been identified by the user as a "need review" file and is tagged with a "needs review" indicia. As shown, directory 312 which is a parent directory to subdirectory 318, as well as subdirectory 318 where file 316 is stored, are also tagged with a "need review" indicia. Thus, the illustrative embodiments tag or identify the entire directory tree structure, whether the directory tree structure is composed of two directories or any number of directories. While files 314 and 316, directories 310 and 312, and subdirectory 318 are shown with indicators, the files may also be identified through the use of coloring the background of the icon, the background of just the text of the icon, the text of the icon with different colors, or through an abbreviated indicia.

As an aspect of the illustrative embodiments, a plurality of files, such as file 314 or 316, with different indicia may be stored in a single directory such as directory 310. In the case of such an event, the user may select which indicia to use with the directory or the user may select a majority option. The majority option would use percentage calculator 320 within operating system 302 to determine, based on the plurality of files with indications, which indicia has the highest percentage and mark the directory with the indicia of the majority.

Figure 4A:
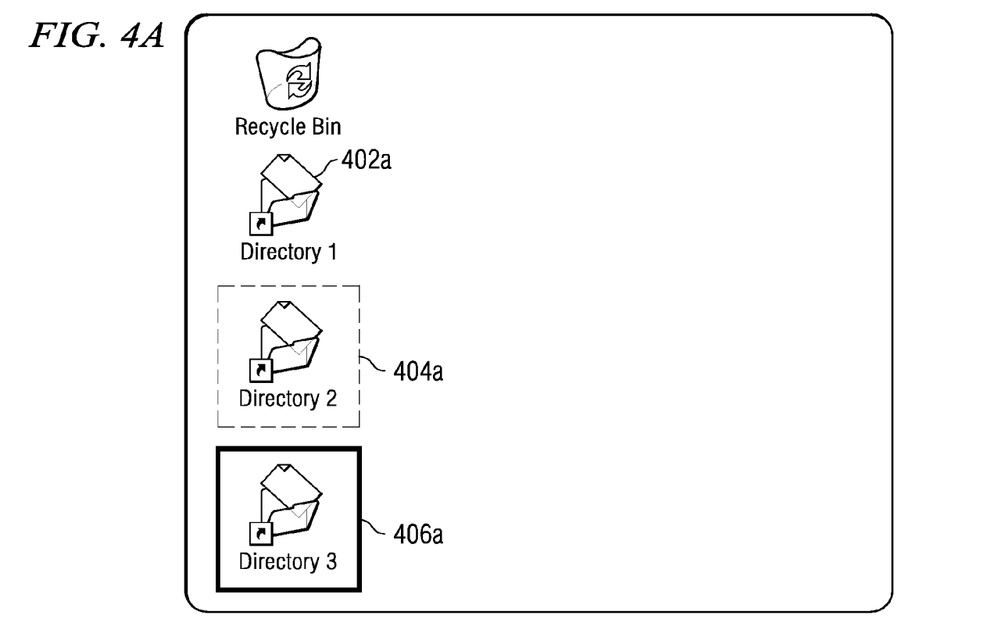
FIGS. 4A, 4B, and 4C depict some exemplary indications that may be implemented in accordance with an illustrative embodiment.
Figure 4B:
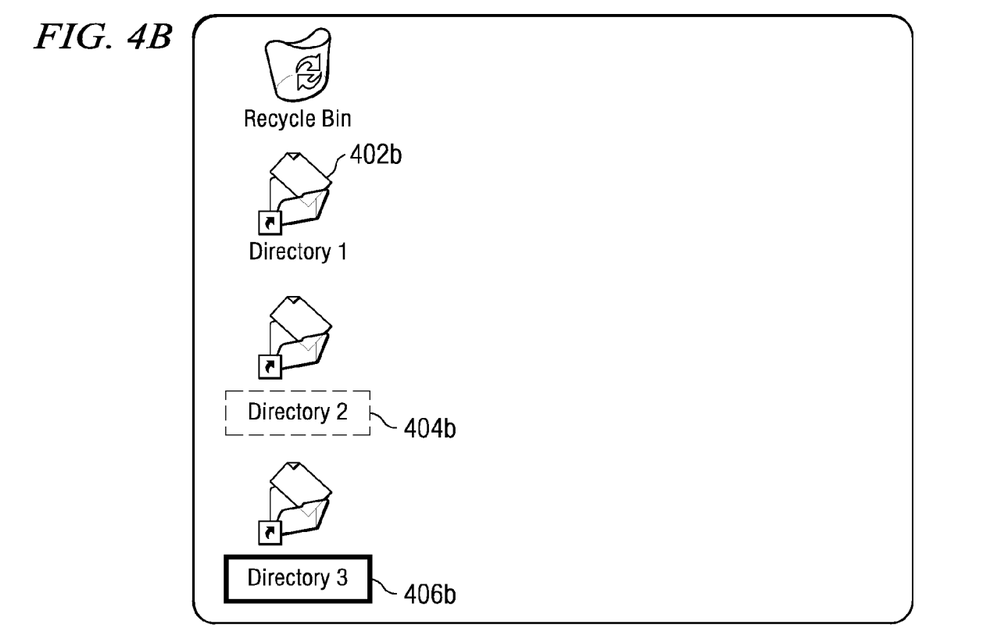
Figure 4C:
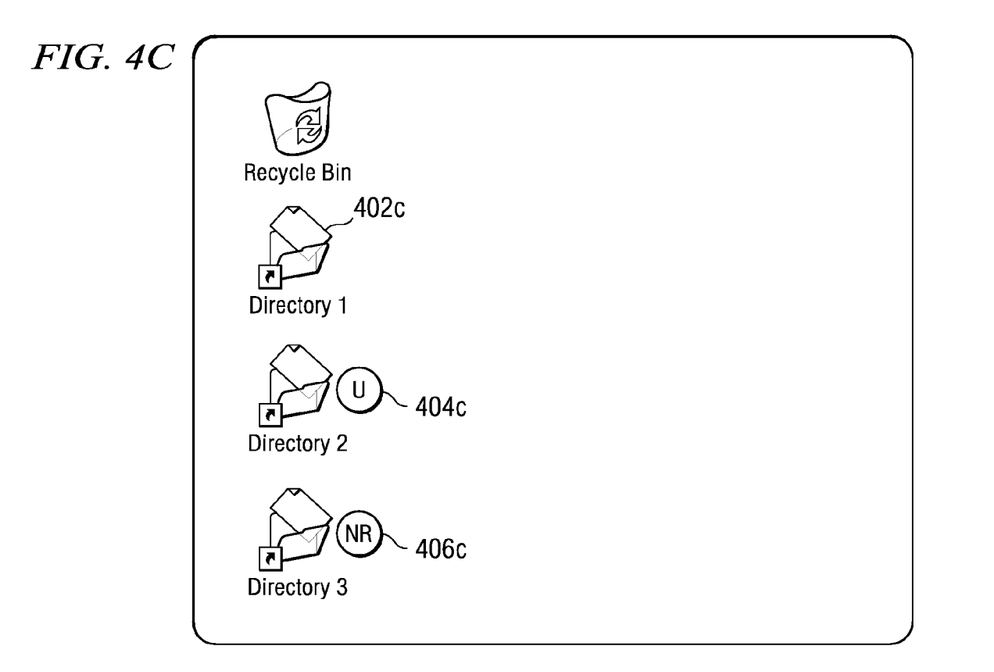

FIGS. 4A, 4B, and 4C depict some exemplary indications that may be implemented in accordance with an illustrative embodiment. FIGS. 4A, 4B, and 4C depict exemplary desktop images that contain directories 402a, 404a, 406a, 402b, 404b, 406b, 402c, 404c, and 406c, respectively, which are representative of directories 308, 310, and 312 of FIG. 3, respectively. FIG. 4A illustrates directory 404a as being identified with a lighter shaded background which is associated with an "urgent" indicia that indicates a file with an "urgent" indicia is stored within the directory. FIG. 4A also depicts directory 406a as being identified with a darker shaded background which is associated with a "needs review" indicia that indicates a file with a "needs review" indicia is stored within the directory or a sub-directory.

FIG. 4B shows directory 404b as being identified with a lighter shaded text background which is associated with an "urgent" indicia that indicates a file with an "urgent" indicia is stored within the directory. FIG. 4B also depicts directory 406b as being identified with a darker shaded text background which is associated with a "needs review" indicia that indicates a file with a "needs review" indicia is stored within the directory or a sub-directory.

FIG. 4C illustrates directory 404c as being identified with an abbreviated indicia which is associated with an "urgent" indicia that indicates a file with an "urgent" indicia is stored within the directory. FIG. 4C also depicts directory 406c as being identified with an abbreviated indicia which is associated with a "needs review" indicia that indicates a file with a "needs review" indicia is stored within the directory or a sub-directory.

While FIGS. 4A, 4B, and 4C depict a desktop view of directories, the same type of identification may be used in tree structure file system view of directories and files on a computer system or any other graphical user interface where directories and files are viewed, such as an email system.

Figure 5:
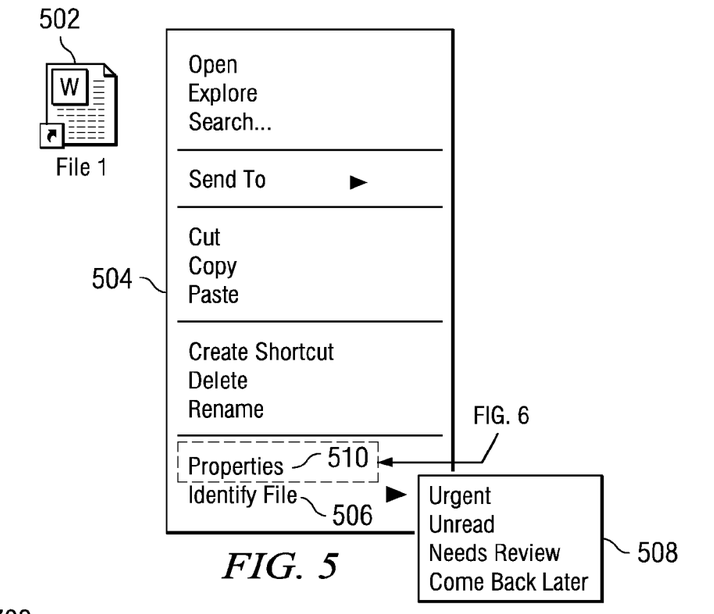
FIG. 5 is a diagram of exemplary options associated with a file in accordance with an illustrative embodiment.

FIG. 5 is a diagram of exemplary options associated with a file in accordance with an illustrative embodiment. When a user receives file 502 via an email, through a network, or through another means where a file is received on a computer system, a user may right-click using a mouse on file 502 to access options that are associated with the file. File 502 is a file such as file 316 of FIG. 3. The options are provided through menu 504, which pop-ups in response to a right-click of a mouse. As an aspect of this illustrative embodiment, menu 504 has been modified to provide an additional option, identify file 506. If the user selects identify file option 506, indicia menu 508 may pop-up that allows the user to select the indicia the user wants to associate with the file and the file will be marked using the selected indicia. If the user selects properties 510, a properties menu starts which contains the properties associated with file 502.

In another illustrative embodiment, if file 502 is detached from an email or saved from a disk, the operating system identifies file 502 as not been read but is merely being saved to a particular directory. Thus, the operating system may prompt the user through the use of a pop-up inquiring whether the user would like to mark file 502 with an indicia. If the user responds positively, indicia menu 508 may appear allowing the user to select an appropriate indicia and the file will be marked using the selected indicia.

In still another illustrative embodiment, if file 502 is received as an attachment to an email, the operating system may use a policy database that correlates the originator of the email with file 502. The policy database may store the indicia that is associated with the originator and automatically store file 502 with the indicia identified in the policy database and the file will be marked using the identified indicia.

Figure 6:
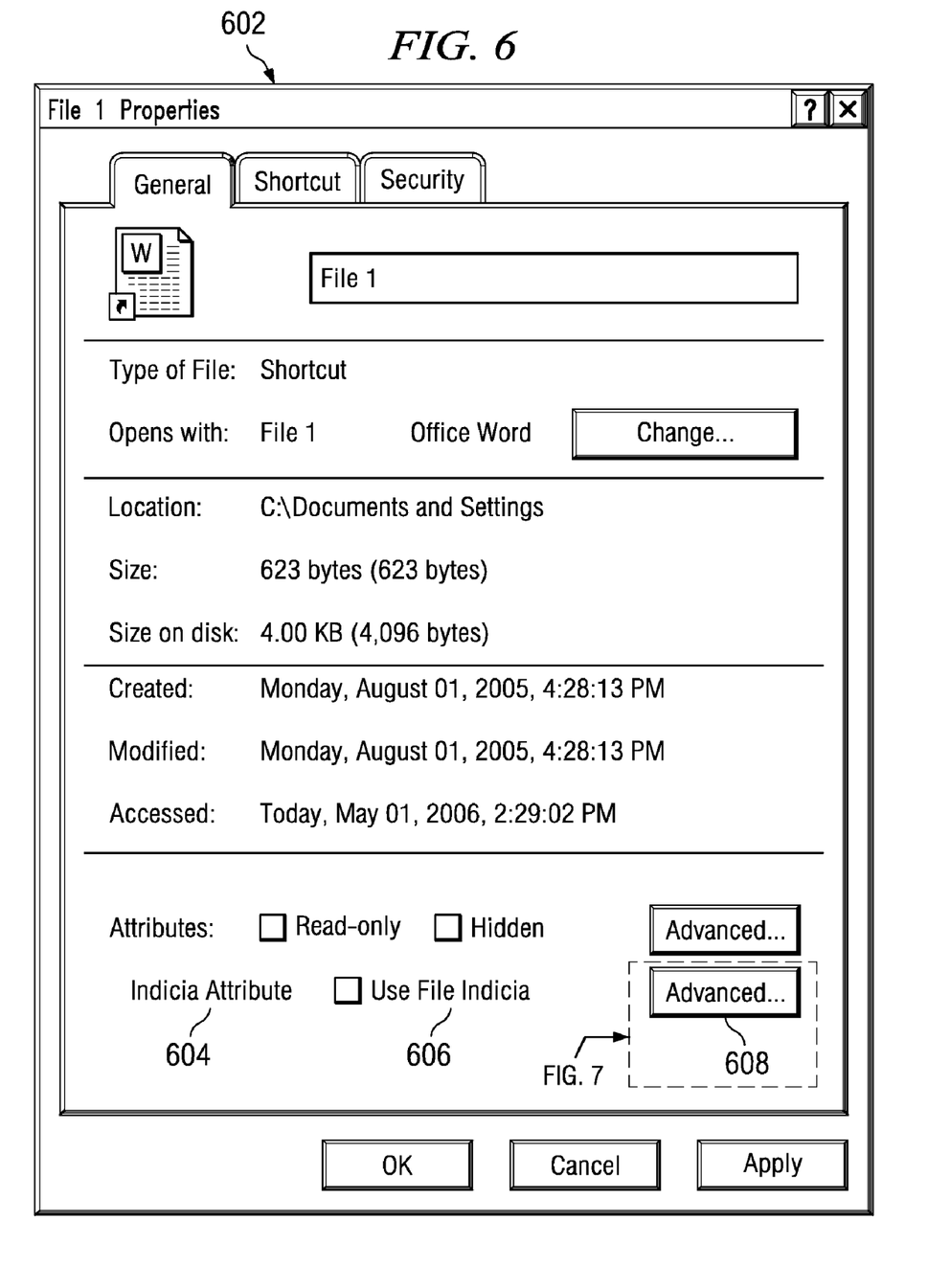
FIG. 6 depicts an exemplary file properties menu associated with a file in accordance with an illustrative embodiment.

FIG. 6 depicts an exemplary file properties menu associated with a file in accordance with an illustrative embodiment. File properties 602 are properties associated with a file such as file 502 of FIG. 5. In accordance with this illustrative embodiment, file properties 602 contains a file indicia attribute area 604. If the user selects the identify file option described in FIG. 5, use file indicia option 606 will be selected. The user may cancel use file indicia option 606 by de-selecting use file indicia option 606 or may select advanced option 608 to change how the selected identification should appear. If advanced option 608 is selected, an indicia attributes menu will start so that the user may select the attributes associated with the file indicia.

Figure 7:
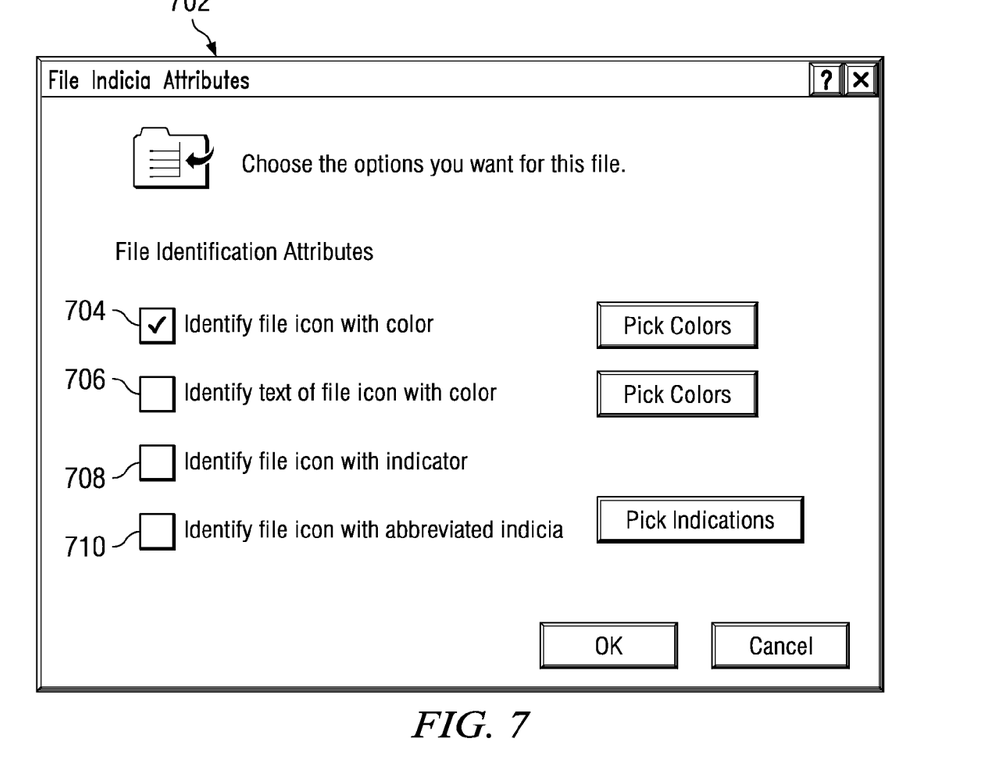
FIG. 7 depicts an exemplary file indicia attributes menu in accordance with an illustrative embodiment.

FIG. 7 depicts an exemplary file indicia attributes menu in accordance with an illustrative embodiment. File indicia attributes menu 702 are indicia attributes associated with selecting advanced options 608 of FIG. 6. In file indicia attributes menu 702, the user may select identify file icon with color 704, identify text of file icon with color 706, identify file icon with indicator 708, or identify file icon with abbreviated indicia 710. If the user selects identify file icon with color 704, identify text of file icon with color 706, or identify file icon with abbreviated identifier 710, the user may select the colors or abbreviated indicia the user would like to use. While FIG. 7 depicts a few exemplary identification methods, other identification methods may also be incorporated. Additionally, while not illustrated in FIG. 7, a user may also be able to edit the indications that the user would like to use, such as "urgent," "unread," "needs review," or "come back to later."

As the user adds or deletes indications, the indications will appear in the identifier menu, such as indicia menu 508 of FIG. 5.

Figure 8:
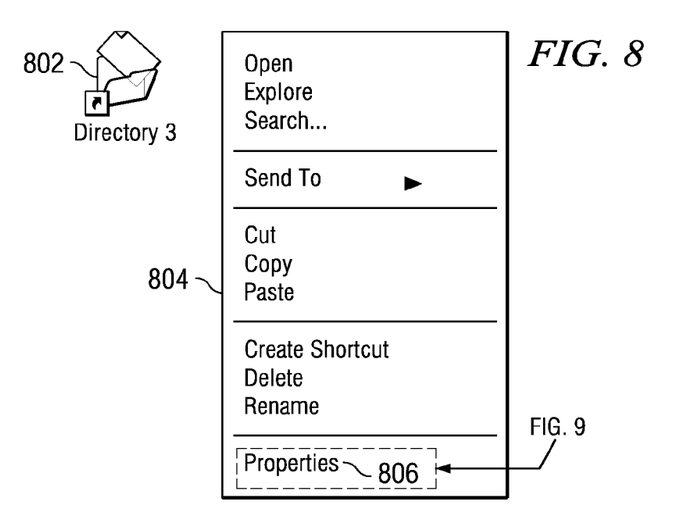
FIG. 8 depicts exemplary options associated with a directory in accordance with an illustrative embodiment.

FIG. 8 depicts exemplary options associated with a directory in accordance with an illustrative embodiment. When a user stores a file in directory 802 on a computer system, a user may right-click using a mouse on directory 802 to access options that are associated with the directory. Directory 802 is a directory such as directory 312 of FIG. 3. The options are provided through menu 804, which pop-ups in response to a right-click of a mouse. If the user selects properties 806, a properties menu is presented which contains the properties associated with directory 802.

In still another illustrative embodiment, if directory 802 receives a file, the operating system may identify the file as not being read and prompt the user through the use of a pop-up inquiring whether the user would like to mark directory 802 with an indicia. If the user responds positively, the directory would take on the attributes of any file which uses an indicia that is stored within the directory and the directory will be marked using the selected indicia.

Figure 9:
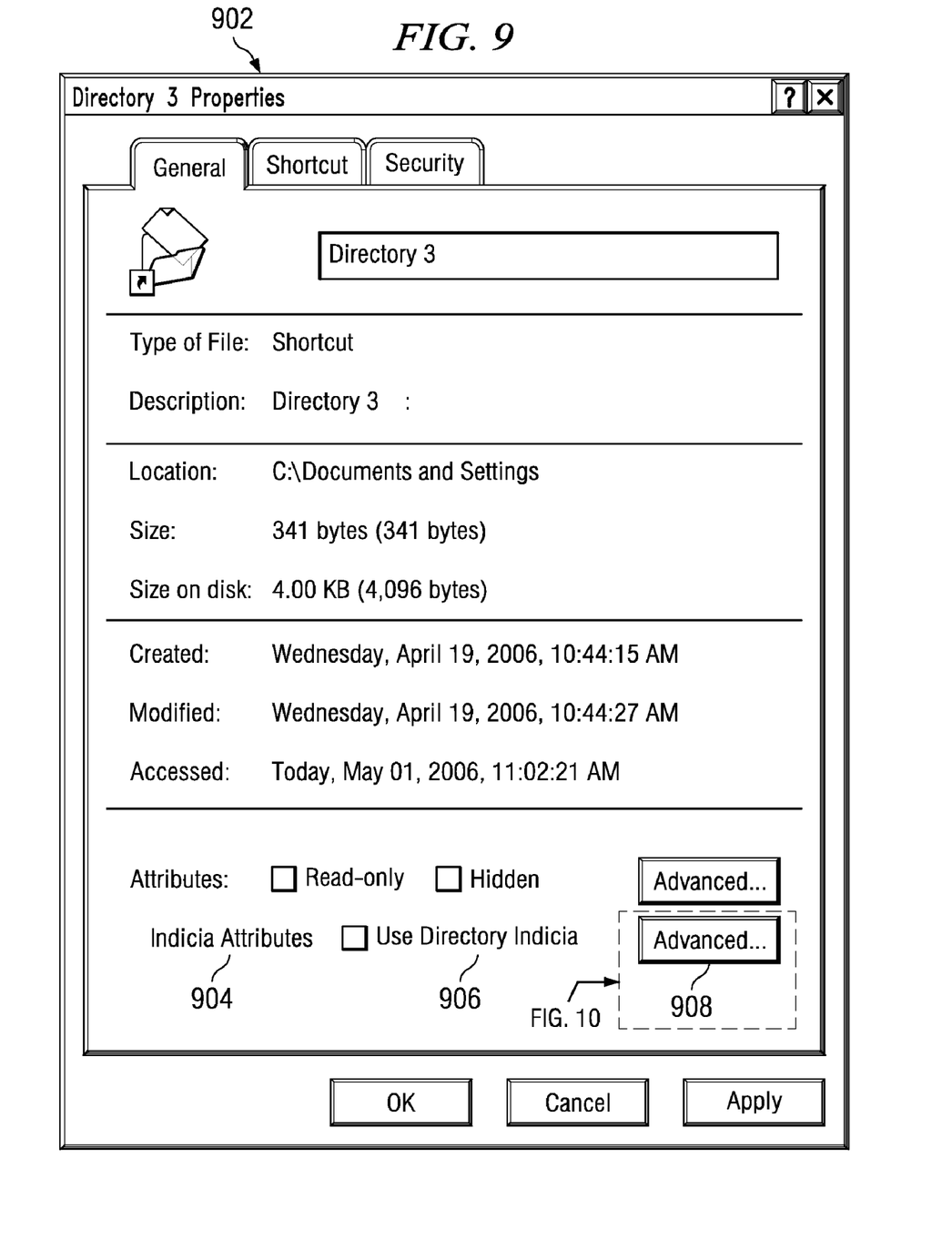
FIG. 9 depicts an exemplary directory properties menu associated with a directory in accordance with an illustrative embodiment.

FIG. 9 depicts an exemplary directory properties menu associated with a directory in accordance with an illustrative embodiment. Directory properties 902 are properties associated with a directory such as directory 802 of FIG. 8. In accordance with this illustrative embodiment, directory properties 902 contains a directory indicia attributes area 904. If the user selects use directory indicia option 906, the directory will take on the attributes of any file which uses an indicia that is stored within the directory and the directory will be marked using the selected indicia. Also, though not shown, the user may be prompted at this time whether to make the use directory indicia option 906 selection global to all directories on the users' computer. When the user selects the global option the operating system will select the use directory indicia option 906 for all directories on the user's computer. The user may cancel use directory indicia option 906 by de-selecting use directory indicia option 906 or may select advanced option 908 to change how the selected identification should appear. If advanced option 908 is selected, an indicia attributes menu is presented so that the user may select the attributes associated with the directory indicia.

Figure 10:
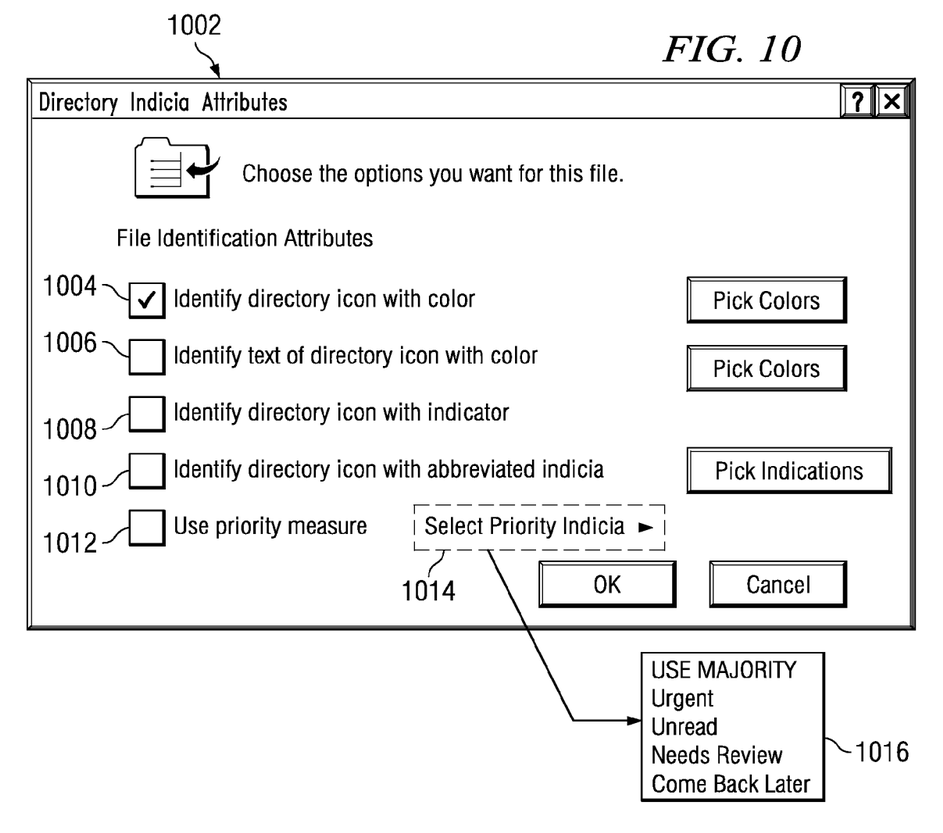
FIG. 10 depicts an exemplary directory indicia attributes menu in accordance with an illustrative embodiment.

FIG. 10 depicts an exemplary directory indicia attributes menu in accordance with an illustrative embodiment. Directory indicia attributes menu 1002 is indicia attributes associated with selecting advanced options 908 of FIG. 9. In directory indicia attributes menu 1002, the user may select identify directory icon with color 1004, identify text of directory icon with color 1006, identify directory icon with indicator 1008, or identify directory icon with abbreviated indicia 1010. If the user selects identify directory icon with color 1004, identify text of directory icon with color 1006, or identify directory icon with abbreviated indicia 1010, the user may select the colors or indications the user would like to use. While FIG. 7 allows a user to select attributes to be used with a file indicia, the user may select a different option other than the option used for the file to be used for the directory as shown in FIG. 10. While FIG. 10 depicts a few exemplary identification methods, other identification methods may also be incorporated.

In the event where a plurality of files, such as file 314 or 316 of FIG. 3, with different indicia are stored in a single directory such as directory 310 of FIG. 3, the user may select use priority measure 1012 for the directory. The user may then select which indicia using select priority indicia 1014. When the user selects select priority indicia 1014, menu 1016 appears that allows the user to select a specific indicia or to select a "use majority" option. The use majority option would use a percentage calculator within the operating system to determine, based on the plurality of files with indications, which indicia has the highest percentage and mark the directory with the indicia of the majority.

Figure 11:
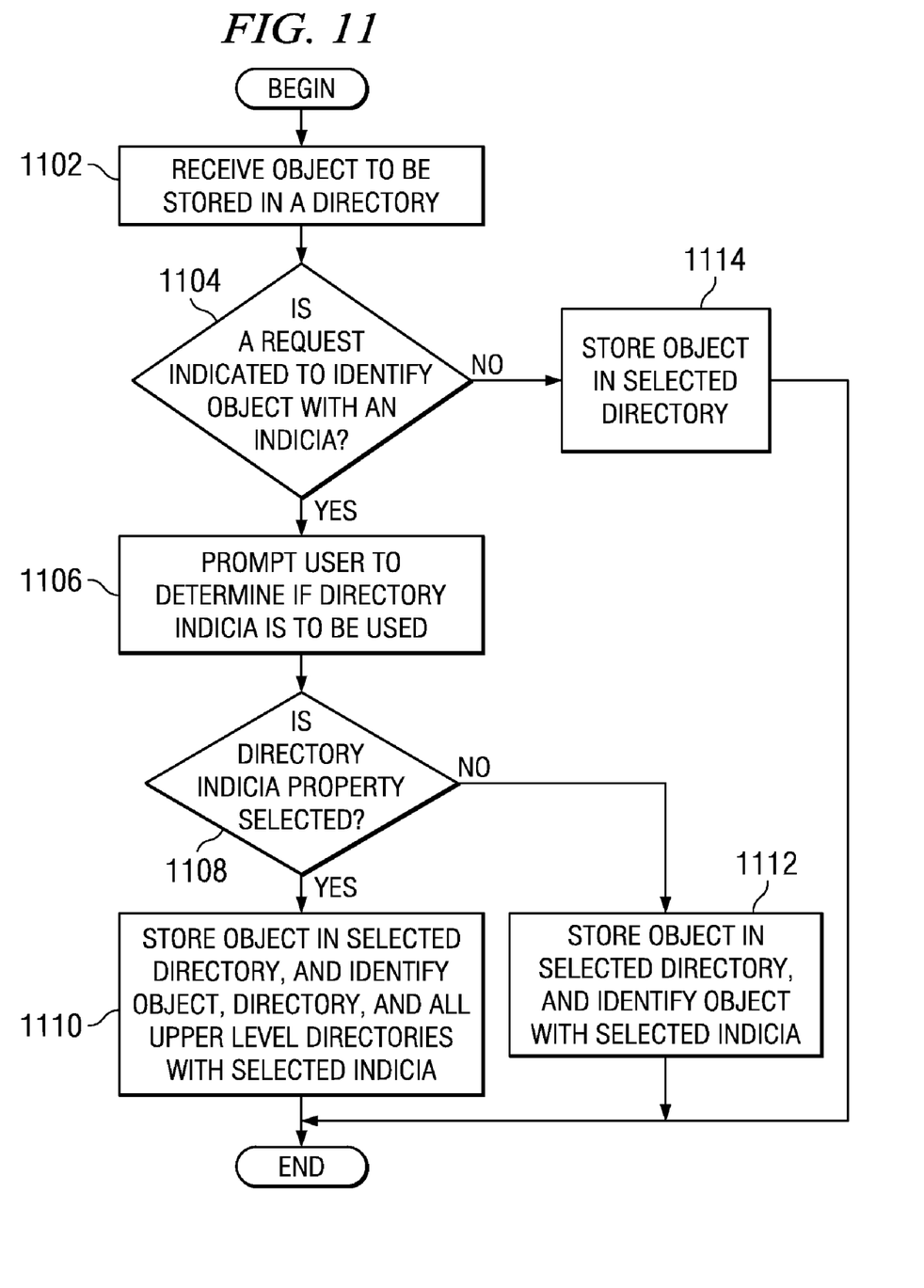
FIG. 11 depicts the operation of associating an indicia with an object and directory in accordance with an illustrative embodiment.

FIG. 11 depicts the operation of associating an indicia with a object and directory in accordance with an illustrative embodiment. The operation may be implemented by an operating system such as operating system 302 of FIG. 3. As the operation begins, a user receives an object via an email, through a network, or through another means where an object is received on a computer system (step 1102). The operating system determines if the user has requested that the object be identified with an indicia (step 1104). The user may request the use of an indicia as described in FIG. 5. If the user has requested the use of an indicia, the operating system checks the directory properties of the directory where the object is being stored to determine if the object indicia option is selected. If the object indicia option is not selected, the user may be prompted to use the object indicia (step 1106). If the operating system determines the directory where the object is stored has the object indicia property selected (step 1108), the operating system stores the object in the selected directory and marks the object and all directories associated with the object with the selected indicia (step 1110), with the operation ending thereafter.

If at step 1108, the operating system determines that the object indicia property has not been selected, the operating system stores the object in the selected directory and marks only the object with the selected indicia (step 1112), with the operation ending thereafter. Returning to step 1104, if the operating system determines that the user has not requested that the object be identified with an indicia, the operating system stores the object in the selected directory (step 1114), with the operation ending thereafter.

While the above embodiment describes one implementation of categorizing directories using categorized files, there are many ways to implement categorizing directories using categorized files. Such an alternative embodiment may be where unread or important files of a particular file types are stored with an associated indicia. For example, unread or important Excel® files may be stored with a yellow indicia, unread or important text files may be stored with a purple indicia, and unread or important PowerPoint® files may be stored with a blue indicia. Then, a folder that contains unread or important Excel®, text, and PowerPoint® files may toggle through a yellow, purple, and blue indications at some configurable time, such as one to two seconds per indicia.

In an additional alternative embodiment, a user may be able to view the percentages of files that are unread or important within a particular folder by moving a pointer over the folder where a pop-up would appear that shows the indications associated with the files stored in the folder and the percentages associated with each indicia within the indications.

In another alternative embodiment, files and/or directories that are tagged with an indicia may be searched for in a file system. Using the indications in the indications menu, a file system search engine would return all files and/or directories that are marked with indications or, using a specific indicia, the search engine would return only the files and/or directories that use the specific indicia.

Figure 12:
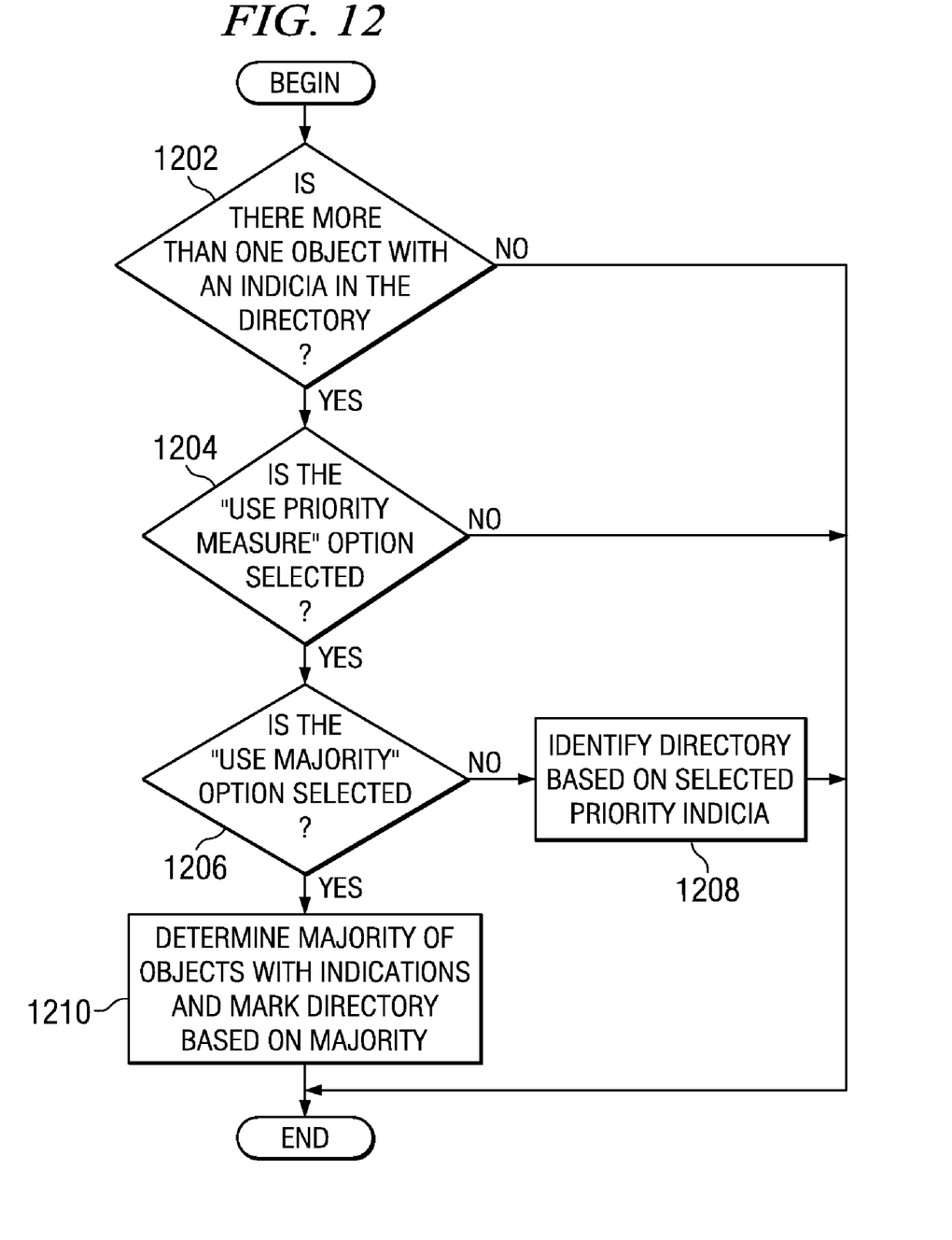
FIG. 12 depicts the operation of categorizing directories using categorized files in accordance with an illustrative embodiment.

FIG. 12 depicts the operation of categorizing directories using categorized files in accordance with an illustrative embodiment. As the operation begins, the operating system determines if there is more than one marked object, an object with an indicia, in a directory (step 1202). If there is no marked object or only one marked object, the operation ends.

If there is more than one marked object, the operating system determines if the "use priority measure" option is selected by the user (step 1204). If the option is unselected, the operation ends. If the option is selected, the operating system determines if the "use majority" option is selected (step 1206). If an option other than the "use majority" option is selected, the operating system marks the directory with the selected indicia (step 1208), with the operation ending thereafter. In the event that an object with the selected indicia is not within the directory, the directory indicia will default to the indicia of the earliest saved object. Returning to step 1206, if the "use majority" option is selected, a percentage calculator within the operating system determines the majority of objects with an indicia and makes the directory with the determined majority indicia (step 1210), with the operation ending thereafter.

Thus, the illustrative embodiments provide for categorizing directories using categorized objects. Responsive to receiving a plurality of objects, the plurality of objects are stored in a directory in a file system. One of a plurality of indicia are associated with each of the plurality of objects. The plurality of objects are displayed using the indicia as a marked objects and the directory is displayed using the indicia of an earliest stored marked object as a marked directory.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for categorizing directories using categorized objects, the computer implemented method comprising:

responsive to receiving a set of objects, storing the set of objects in a directory in a file system;

associating one of a set of indicia with each of the set of objects, wherein associating the one of the set of indicia with the each of the set of objects is determined using a priority measure;

displaying the set of objects using the set of indicia as marked objects;

associating the one of a set of indicia with the directory, wherein associating the one of the set of indicia with the directory is determined using the priority measure;

displaying the directory initially using the one of the set of indicia of an earliest stored marked object as a marked directory;

responsive to selecting a majority option as the priority measure, determining the one of the set of indicia for a majority of the marked objects in the directory and displaying the directory using the one of the set of indicia of the majority of the marked objects as the marked directory;

responsive to selecting an option other than the majority option as the priority measure, displaying the directory using the one of the set of indicia of the option other than the majority option as the marked directory;

responsive to a selection of the marked directory, displaying the marked objects stored within the marked directory;

responsive to determining marked indicia of the marked objects in a particular directory, toggling the display of the particular directory using each of the marked indicia as the marked directory;

responsive to a selection of the marked directory, displaying a percentage of the each of the marked indicia of the marked objects stored within the marked directory;

searching the file system to locate content marked with a specific indicia;

responsive to locating the specific indicia, retrieving the content marked with the specific indicia from the file system; and responsive to receiving a command to edit the set of indicia, editing the set of indicia.

* * * * *